United States Patent
Rote et al.

(10) Patent No.: US 8,680,799 B2
(45) Date of Patent: Mar. 25, 2014

(54) METHOD AND APPARATUS FOR APPLYING A COMMUTATION ADVANCE AUTOMATICALLY IN A BRUSHLESS DC MOTOR

(75) Inventors: John K. Rote, Allen, TX (US); Seil Oh, Plano, TX (US); Brian L. Schmidt, Sachse, TX (US)

(73) Assignee: Texas Instruments Incorporated, Dallas, TX (US)

( * ) Notice: Subject to any disclaimer, the term of this patent is extended or adjusted under 35 U.S.C. 154(b) by 366 days.

(21) Appl. No.: 13/108,725

(22) Filed: May 16, 2011

(65) Prior Publication Data
US 2012/0293098 A1 Nov. 22, 2012

(51) Int. Cl.
*H02P 6/18* (2006.01)
(52) U.S. Cl.
USPC ............ 318/400.34; 318/400.01; 318/400.32; 318/400.35; 318/400.36; 318/599; 318/459; 318/400.14; 318/721; 388/901; 388/909; 388/928.1
(58) Field of Classification Search
USPC .................. 318/400.32, 400.35, 400.01, 721, 318/400.34, 400.04, 400.06, 400.23, 318/400.26, 799, 599, 811, 400.02, 400.03, 318/400.1, 400.13, 400.14, 400.33, 400.36, 318/459; 388/811, 901, 928.1, 823, 909
See application file for complete search history.

(56) References Cited

U.S. PATENT DOCUMENTS

| | | | | |
|---|---|---|---|---|
| 5,245,256 A | * | 9/1993 | Cassat et al. | 318/400.35 |
| 5,455,885 A | * | 10/1995 | Cameron | 388/834 |
| 5,481,166 A | * | 1/1996 | Moreira | 318/400.04 |
| 5,572,097 A | * | 11/1996 | Cameron | 318/400.11 |
| 5,616,996 A | * | 4/1997 | Tang et al. | 318/400.13 |
| 6,163,120 A | * | 12/2000 | Menegoli | 318/400.35 |
| 6,236,179 B1 | * | 5/2001 | Lawler et al. | 318/400.34 |
| 6,498,446 B1 | | 12/2002 | Menegoli et al. | |
| 6,504,328 B1 | * | 1/2003 | Gontowski, Jr. | 318/400.25 |
| 6,512,343 B1 | * | 1/2003 | Yasohara | 318/437 |
| 7,034,478 B2 | | 4/2006 | Bhaumik et al. | |
| 7,531,976 B2 | * | 5/2009 | Fukamizu et al. | 318/400.34 |
| 7,721,564 B2 | * | 5/2010 | Rizzo | 62/228.1 |
| 7,915,844 B2 | * | 3/2011 | Kurosawa et al. | 318/400.4 |
| 8,358,093 B1 | * | 1/2013 | Allison, III | 318/400.35 |
| 2002/0027423 A1 | | 3/2002 | White | |
| 2004/0007998 A1 | * | 1/2004 | Yasohara et al. | 318/437 |
| 2008/0115512 A1 | * | 5/2008 | Rizzo | 62/134 |
| 2008/0224641 A1 | * | 9/2008 | Hoogzaad | 318/400.34 |

* cited by examiner

*Primary Examiner* — Antony M Paul
(74) *Attorney, Agent, or Firm* — Alan A. R. Cooper; W. James Brady, III; Frederick J. Telecky, Jr.

(57) ABSTRACT

To achieve peak acoustic and power performance, the coil or applied current should be in phase or substantially aligned with the back electromotive force (back-EMF) voltage. However, there are generally phase differences between the applied current and back-EMF voltage that are induced by the impedance of the brushless DC motor (which can vary based on conditions, such as temperature and motor speed). Traditionally, compensation for these phase differences was provided manually and on an as-needed basis. Here, however, a system and method are provided that automatically perform a commutation advance by incrementally adjusting a drive signal over successive commutation cycles when the applied current and back-EMF voltage are misaligned.

13 Claims, 3 Drawing Sheets

METHOD AND APPARATUS FOR APPLYING A COMMUTATION ADVANCE AUTOMATICALLY IN A BRUSHLESS DC MOTOR

TECHNICAL FIELD

The invention relates generally to control of a brushless direct current (DC) motor and, more particularly, to automatically applying a commutation advance.

BACKGROUND

There are a number of applications that employ brushless DC motors, and, in many of these applications (i.e., hard disc drives or HDDs), acoustic performance and power consumption of the brushless DC motor can be important. To achieve peak acoustic and power performance, the coil or applied current should be in phase with the back electromotive force (back-EMF) voltage. However, there are generally phase differences between the applied current and back-EMF voltage that are induced by the impedance of the brushless DC motor (which can vary based on conditions, such as temperature and motor speed). Traditionally, compensation for these phase differences was provided manually and on an as-needed basis. Conventional motor controllers would often provide a "commutation advance." This commutation advance would usually be a digital value (i.e., 3 to 4 bits) that could be stored in a register. However, a limited number of bits generally does not provide much control over the system, and usually the end user would adjust the controller to "fit" the motor, which is a tedious and time consuming practice that drives up cost. Therefore, there is a need for an improved motor controller.

Some other conventional systems are: U.S. Pat. Nos. 6,498,446; 7,034,478; and U.S. Patent Pre-Grant Publ. No. 2002/0027423.

SUMMARY

A preferred embodiment of the present invention, accordingly, provides a method for reducing acoustic noise in a brushless direct current (DC) motor. The method comprises applying a drive signal to a drive circuit; determining a zero-crossing for a back electromotive force (back-EMF) voltage for the brushless DC motor based at least in part on the drive signal; measuring an applied current applied to the brushless DC motor by the driver in response to the drive signal; comparing the zero-crossing for the back-EMF voltage to a zero-crossing for the applied current; and incrementally adjusting the drive signal so as to substantially align the zero-crossing for the back-EMF voltage and the zero-crossing for the applied current.

In accordance with an embodiment of the present invention, the step of determining further comprises determining a position for the zero-crossing for the back-EMF voltage within a window.

In accordance with an embodiment of the present invention, the step of comparing further comprises: determining a plurality of signs of a magnitude of the applied current within the window, wherein each sign is determined at a predetermined interval; incrementing a counter for each sign that is one of positive and negative to generate a position for the zero-crossing for applied current; and comparing the position for the zero-crossing for the back-EMF voltage to the position for the zero-crossing for the applied current to generate a position difference.

In accordance with an embodiment of the present invention, the step of incrementally adjusting further comprises iteratively adjusting the drive signal until the position difference is less than the predetermined interval.

In accordance with an embodiment of the present invention, the drive signal further comprises a plurality of pulse width modulation (PWM) signals.

In accordance with an embodiment of the present invention, the step of measuring further comprises sampling the applied current for each PWM cycle.

In accordance with an embodiment of the present invention, an apparatus is provided. The apparatus comprises a drive circuit that drives a brushless DC motor; a sense circuit that is coupled to the drive circuit so as to measure an applied current for the brushless DC motor; and a control circuit that is coupled to the sense circuit and the drive circuit, wherein the control circuit: applies a drive signal to the drive circuit; determines a zero-crossing for a back-EMF voltage for the brushless DC motor based at least in part on the drive signal; compares the zero-crossing for the back-EMF voltage to a zero-crossing for the applied current; and incrementally adjusts the drive signal so as to substantially align the zero-crossing for the back-EMF voltage and the zero-crossing for the applied current.

In accordance with an embodiment of the present invention, the drive circuit further comprises a plurality of half-H-bridges.

In accordance with an embodiment of the present invention, the sense circuit further comprises a plurality of current sensors, wherein each current sensor is associated with at least one of the transistors from at least one of the half-H-bridges.

In accordance with an embodiment of the present invention, the control circuit further comprises: an analog-to-digital converter (ADC) that is coupled to the sense circuit so as to generate a digitized applied current; a processor having a memory with a computer program embodied thereon, wherein the processor is coupled to the ADC, and wherein the processor compares the zero-crossing for the back-EMF voltage to the zero-crossing for the applied current and incrementally adjusts the drive signal; and a controller that is coupled between the processor and drive circuit, wherein the controller applies a drive signal to the drive circuit and determines the zero-crossing for the back-EMF voltage.

In accordance with an embodiment of the present invention, the drive circuit further comprises: a pre-driver that is coupled to the controller; and a driver that is coupled to the pre-driver and the sense circuit.

In accordance with an embodiment of the present invention, the apparatus further comprises the DC brushless motor, which is coupled to the driver.

In accordance with an embodiment of the present invention, the processor further comprises a digital signals processor (DSP).

In accordance with an embodiment of the present invention, an apparatus is provided. The apparatus comprises a drive circuit; a controller that a drive signal to the drive circuit and that determines a zero-crossing for a back-EMF voltage for a brushless DC motor based at least in part on the drive signal; a sense circuit that measures an applied current applied to the brushless DC motor by the drive circuit in response to the drive signal; and a processor having a storage medium with a computer program embodied thereon, wherein the computer program includes: computer code for comparing the zero-crossing for the back-EMF voltage to a zero-crossing for the applied current; and computer incrementally adjusting the drive signal so as to substantially align the zero-crossing for the back-EMF voltage and the zero-crossing for the applied current.

In accordance with an embodiment of the present invention, the controller determines a position for the zero-crossing for the back-EMF voltage within a window.

In accordance with an embodiment of the present invention, the computer code for comparing further comprises: computer code for determining a plurality of signs of a magnitude of the applied current within the window, wherein each sign is determined at a predetermined interval; computer code for incrementing a counter for each sign that is one of positive and negative to generate a position for the zero-crossing for applied current; and computer code for comparing the position for the zero-crossing for the back-EMF voltage to the position for the zero-crossing for the applied current to generate a position difference.

In accordance with an embodiment of the present invention, the computer code for incrementally adjusting further comprises computer code for iteratively adjusting the drive signal until the position difference is less than the predetermined interval.

In accordance with an embodiment of the present invention, the drive signal further comprises a plurality of PWM signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
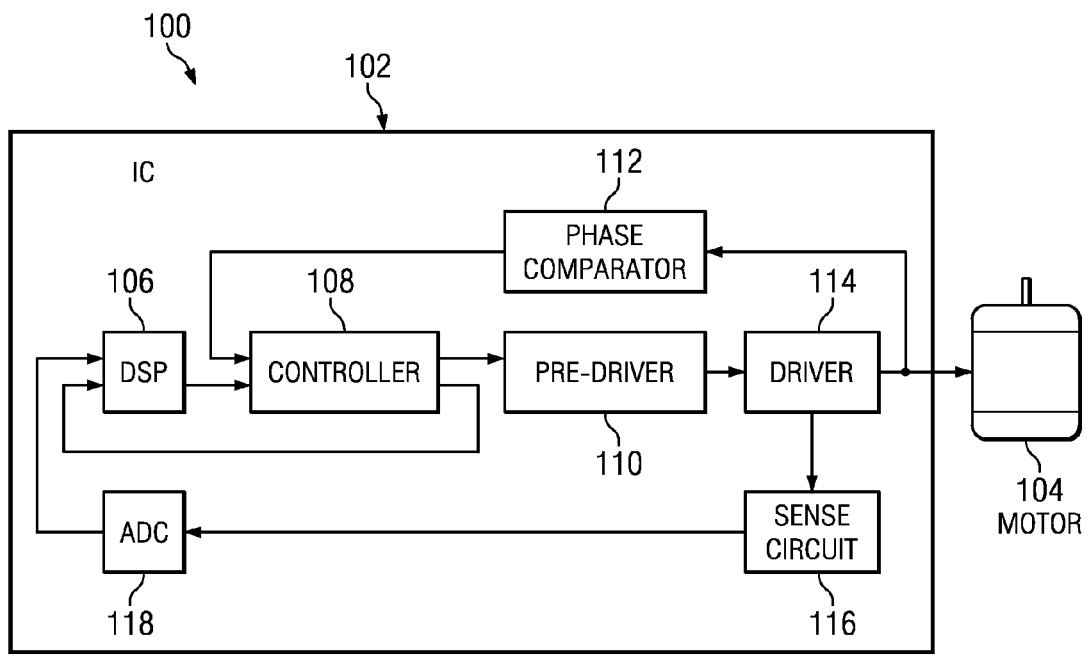
FIG. 1 is a diagram of an example of a system in accordance with an embodiment of the present invention.

Refer now to the drawings wherein depicted elements are, for the sake of clarity, not necessarily shown to scale and wherein like or similar elements are designated by the same reference numeral through the several views.

Figure 2:
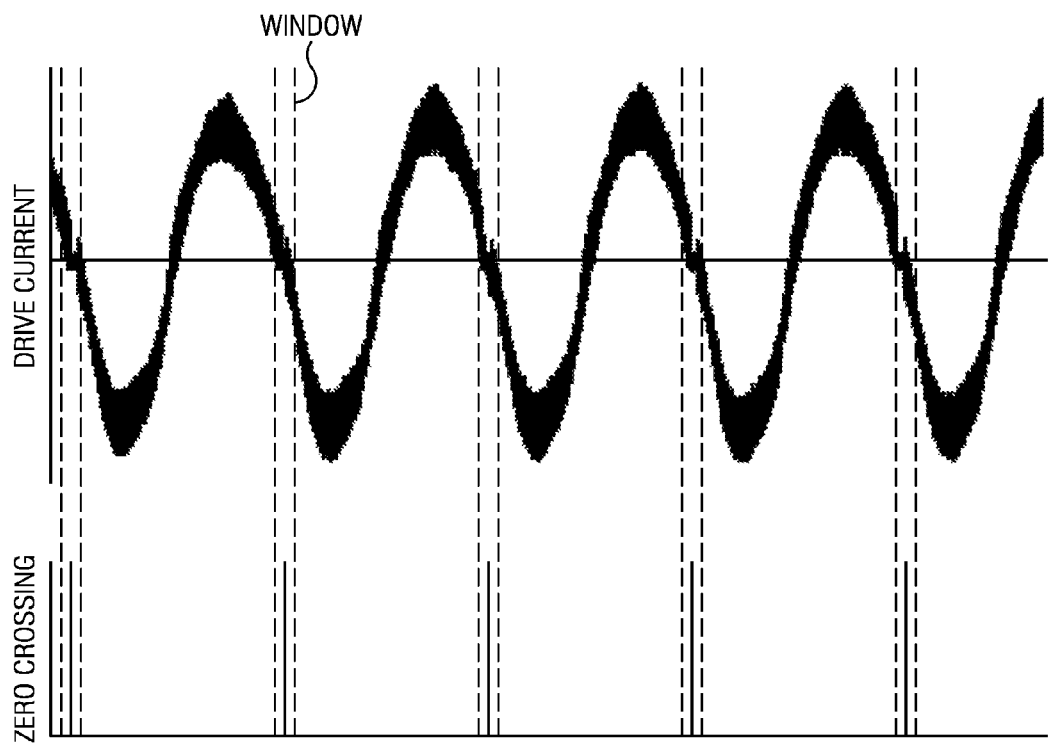
FIG. 2 is a diagram depicting a general operation of a portion of the system of FIG. 1.

Turning to FIG. 1, a system 100 in accordance with a preferred embodiment of the present invention can be seen. System 100 generally comprises an integrated circuit (IC) 102 and motor 104. The IC 102 generally comprises a digital signals processor (DSP) 106 (which typical includes a memory with a computer program embodied thereon), a controller 108, pre-driver 110, phase comparator 112, driver, 114, sense circuit 116, and an analog-to-digital converter (ADC) 118. In operation, the IC 102 generates an applied voltage and applied (or coil) current for the motor 104 (which can be a sensorless, brushless DC motor with any number of phases) to drive the motor 104. The motor 104 for this example (which is three-phase brushless DC motors) can generate sinusoidal back-EMF voltages for each of three phases, which are a function of velocity and rotor position and which are separated by 120 degrees. To control this motor 104, IC 102 can use the back-EMF voltage generated by the motor to commutate the motor when the motor is operating at a generally constant rotational speed (also known as "run speed" for HDD applications), or it can be used in acceleration. For example, in a three-phase DC motor, two of the phases are engaged while the third phase is in a high impedance state. Commutation logic (i.e., controller 108 and DSP 106) within the IC 100 can use the third phase to measure the time for a zero-crossing of the back-EMF voltage during a window (as shown in FIG. 2). Additionally, controller 108 issues a commutation clock signal that can be converted into the applied voltage (and applied or coil current) for the motor 104 by the pre-driver 110 and driver 114.

Figure 3:
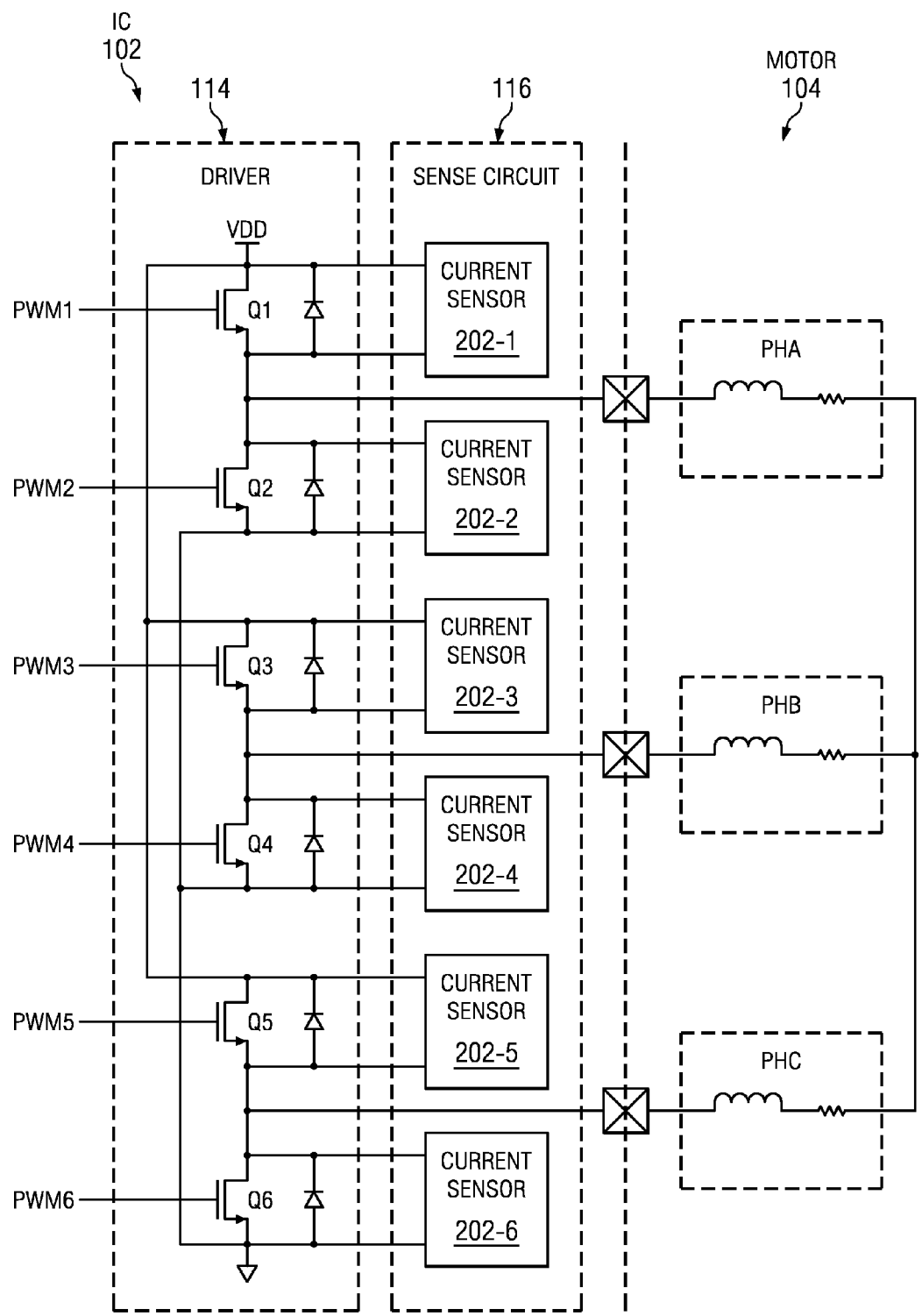
FIG. 3 is a diagram of an example of the driver, sense circuit, and motor of FIG. 1.

To be able to drive the motor 104, the driver 114 (as shown in FIG. 3) generally comprises three half-H-bridges (i.e., transistors Q1 through Q6) that generally function as discrete driving components for each of the phases PHA, PHB, and PHC of motor 104. When motor 104 (in this example) is being driven one of phases PHA, PHB, and PHC sources current, one of phases PHA, PHB, and PHC sinks current, and the remaining phase PHA, PHB, or PHC can either sink or source current. For example, if current $I_{AB}$ is being supplied, transistors Q1 and Q4 would be "on," while phase PHC and its transistors Q5 and Q6 can be ignored. These transistors Q1 through Q6 are driven by the application of pulse width modulation (PWM) signals PWM1 to PWM6 from pre-driver 110 (which can collectively function as a drive signal for motor 104) to transistors Q1 through Q6 of driver 114.

Additionally, to provide automatic commutation advance, additional information (namely, applied or coil current) should be determined. This applied or coil current measurement is generally performed by sense circuit 116. As shown in FIG. 3, this sense circuit 116 is generally comprised of current sensors 202-1 to 202-6 that are associated with transistors Q1 to Q6, respectively. Generally, for each PWM cycle, appropriate current sensors (i.e., current sensors 202-1 and 202-4 for the example above) sample the applied or coil current; generally, currents sensors for the sourcing and sinking transistors are used. These sensed currents are then digitized by the ADC 118 so as to provide a zero-crossing measurement for the applied current to the DSP 106. Controller 108 (which generates the commutation clock signal) also determines when there is a zero-crossing for back-EMF voltage, which is also provided to the DSP 106.

Figure 4:
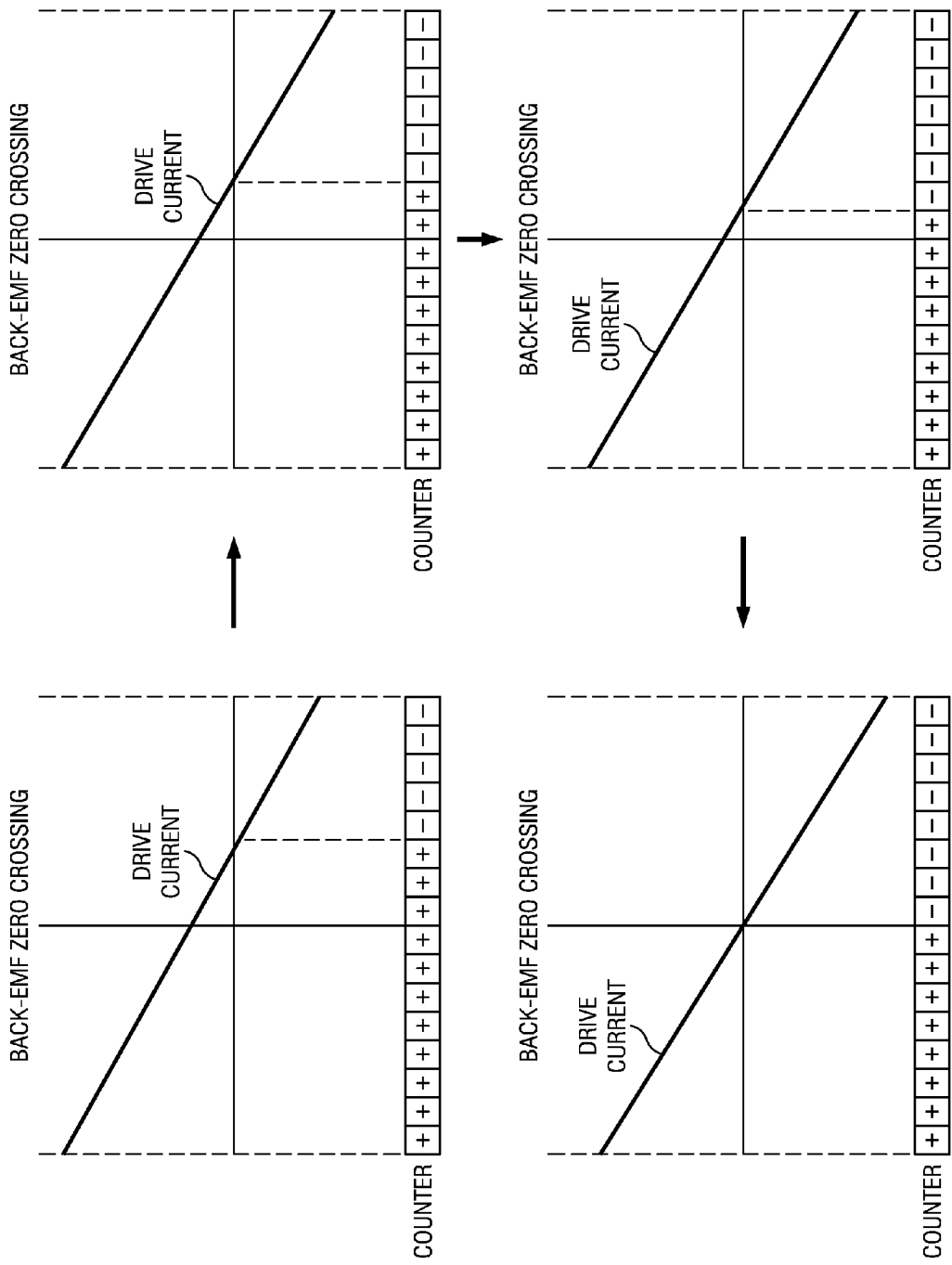
FIG. 4 is a diagram depicting an example of an automatic commutation advance for the system of FIG. 1.

Based on the zero-crossings for the back-EMF voltage and the applied current, the DSP 106 is able to calculate an error between these zero-crossings. This is generally accomplished through a relative comparison between the zero-crossing positions within a window (which can be seen in FIG. 4). As shown, a counter (which can be hardware or can be software within DSP 106) can be incremented to count the number of predetermined intervals for which the magnitude of is greater than (or, alternatively, less than) zero. A comparison (using, for example, an up-down counter) of the count values for the zero-crossings of back-EMF voltage and the applied current determines the error between these zero-crossings. In the example shown in FIG. 4, the error is three periods (which, if each period is 10 ns, would be 30 ns). Based on this error, the DSP 106 can provide an adjustment to the PWM signals PWM1 to PWM6 (through controller 108 and the commutation clock signal) by a fixed or predetermined amount iteratively over successive commutation cycles until the difference between the zero-crossings is, for example, less than one predetermined interval (i.e., less than 50 ns). A reason for incrementally adjusting this drive signal is that system 100 is nonlinear, and one large adjustment may result in instability in system 100. Once adjusted, this automatic commutation advance can also then be performed periodically to generally ensure that the back-EMF voltage and the applied current are substantially aligned or within a predetermined error range (i.e., less than 50 ns apart). As an alternative, both the magnitude and the sign can be used to determine the zero-crossing for the applied current. Under these circumstances, the position of the zero-crossing for the applied current can be determined with much higher accuracy because interpolation of the zero-crossing can be employed, but this is at the cost of increased computing resources (i.e., within DSP 106) being consumed.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method for reducing acoustic noise in a brushless direct current (DC) motor, the method comprising:
    applying a drive signal to a drive circuit;
    determining a zero-crossing for a back electromotive force (back-EMF) voltage for the brushless DC motor based at least in part on the drive signal;
    measuring an applied current applied to the brushless DC motor by the driver in response to the drive signal;
    comparing the zero-crossing for the back-EMF voltage to a zero-crossing for the applied current; and
    incrementally adjusting the drive signal so as to substantially align the zero-crossing for the back-EMF voltage and the zero-crossing for the applied current,
    wherein the step of determining further comprises determining a position for the zero-crossing for the back-EMF voltage within a window,
    wherein the step of comparing further comprises:
        determining a plurality of signs of a magnitude of the applied current within the window, wherein each sign is determined at a predetermined interval;
        incrementing a counter for each sign that is one of positive and negative to generate a position for the zero-crossing for applied current; and
        comparing the position for the zero-crossing for the back-EMF voltage to the position for the zero-crossing for the applied current to generate a position difference.

2. The method of claim 1, wherein the step of incrementally adjusting further comprises iteratively adjusting the drive signal until the position difference is less than the predetermined interval.

3. The method of claim 2, wherein the drive signal further comprises a plurality of pulse width modulation (PWM) signals.

4. The method of claim 3, wherein the step of measuring further comprises sampling the applied current for each PWM cycle.

5. An apparatus comprising:
    a drive circuit that drives a brushless DC motor;
    a sense circuit that is coupled to the drive circuit so as to measure an applied current for the brushless DC motor; and
    a control circuit that is coupled to the sense circuit and the drive circuit, wherein the control circuit:
    applies a drive signal to the drive circuit;
    determines a zero-crossing for a back-EMF voltage for the brushless DC motor based at least in part on the drive signal;
    compares the zero-crossing for the back-EMF voltage to a zero-crossing for the applied current; and
    incrementally adjusts the drive signal so as to substantially align the zero-crossing for the back-EMF voltage and the zero-crossing for the applied current, wherein the drive circuit further comprises a plurality of half-H-bridges,
    wherein the sense circuit further comprises a plurality of current sensors, wherein each current sensor is associated with at least one of the transistors from at least one of the half-H-bridges,
    wherein the control circuit further comprises:
        an analog-to-digital converter (ADC) that is coupled to the sense circuit so as to generate a digitized applied current;
        a processor having a memory with a computer program embodied thereon, wherein the processor is coupled to the ADC, and wherein the processor compares the zero-crossing for the back-EMF voltage to the zero-crossing for the applied current and incrementally adjusts the drive signal; and
        a controller that is coupled between the processor and drive circuit, wherein the controller applies a drive signal to the drive circuit and determines the zero-crossing for the back-EMF voltage.

6. The apparatus of claim 5, wherein the drive circuit further comprises:
    a pre-driver that is coupled to the controller; and
    a driver that is coupled to the pre-driver and the sense circuit.

7. The apparatus of claim 6, wherein the apparatus further comprises the DC brushless motor, which is coupled to the driver.

8. The apparatus of claim 7, wherein the processor further comprises a digital signals processor (DSP).

9. An apparatus comprising:
    a drive circuit;
    a controller that applies a drive signal to the drive circuit and that determines a zero-crossing for a back-EMF voltage for a brushless DC motor based at least in part on the drive signal;
    a sense circuit that measures an applied current applied to the brushless DC motor by the drive circuit in response to the drive signal; and
    a processor having a storage medium with a computer program embodied thereon, wherein the computer program includes:
        computer code for comparing the zero-crossing for the back-EMF voltage to a zero-crossing for the applied current; and
        computer code for incrementally adjusting the drive signal so as to substantially align the zero-crossing for the back-EMF voltage and the zero-crossing for the applied current,
    wherein the controller determines a position for the zero-crossing for the back-EMF voltage within a window, wherein the computer code for comparing further comprises:
  computer code for determining a plurality of signs of a magnitude of the applied current within the window, wherein each sign is determined at a predetermined interval;
  computer code for incrementing a counter for each sign that is one of positive and negative to generate a position for the zero-crossing for applied current; and
  computer code for comparing the position for the zero-crossing for the back-EMF voltage to the position for the zero-crossing for the applied current to generate a position difference.

10. The apparatus of claim 9, wherein the computer code for incrementally adjusting further comprises computer code for iteratively adjusting the drive signal until the position difference is less than the predetermined interval.

11. The apparatus of claim 10, wherein the drive signal further comprises a plurality of PWM signals.

12. The apparatus of claim 11, wherein the drive circuit further comprises:
  a pre-driver that is coupled to the controller; and
  a driver that is coupled to the pre-driver and the sense circuit.

13. The apparatus of claim 12, wherein the processor further comprises a DSP.

* * * * *